United States Patent Office 3,428,688
Patented Feb. 18, 1969

3,428,688
PREPARATION OF OLEFINIC SULFIDES
El-Ahmadi I. Heiba, Princeton, N.J., assignor to Mobil Oil Corporation, a corporation of New York
No Drawing. Filed Sept. 30, 1965, Ser. No. 491,809
U.S. Cl. 260—609
Int. Cl. C07c *149/08, 149/10*
14 Claims

ABSTRACT OF THE DISCLOSURE

The preparation of organic sulfides containing a substituted or unsubstituted vinyl group by the vapor phase pyrolytic cleavage or organic vicinal bis-sulfides over adsorptive agents of high surface area as exemplified by the cleavage of 1,2-bis(phenylthio)-propane over activated carbon particles at 300 to 400° C. to form predominantly 2-phenylthiopropylene. Yields are improved by charging certain acetylenic or diolefinic compounds (e.g., allene) to the reaction to react additively with the mercaptan product of the primary reaction (e.g., benzenethiol) and form more of the vinyl sulfide products.

---

The present invention relates to the formation of olefinic sulfides by the cleavage of organic vicinal bis-sulfides. In one particular preferred embodiment, it relates to the cleavage of various 1,2-bis-sulfides by pyrolysis to form vinyl sulfides with appropriate elimination of by-products.

Vinyl sulfides have previously been prepared by methods that were either complex or involved the use of reactants which are relatively dangerous and/or difficult to handle, such as acetylene. In addition, some of the prior art methods were lacking in selectivity as to the preparation of the desired product in high proportion.

It has been discovered that a wide variety of unsaturated organic sulfides and particularly vinyl sulfides can be prepared in high yields by a simple, safe and efficient pyrolysis reaction which also provides considerable selectivity as to the desired products.

The present invention involves a process for producing an olefinic sulfide which comprises the vapor phase pyrolytic cleavage of an organic vicinal bis-sulfide in a reaction according to the equation:

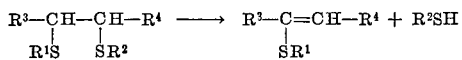

wherein $R^1$, $R^2$, $R^3$ and $R^4$ each represent a substituent of the group consisting of hydrogen and monovalent organic radicals stable at temperatures up to about 450° C. and devoid of non-benzenoid unsaturation as illustrated by unsubstituted and substituted alkyl, heterocyclic, aryl, aralkyl and alkaryl radicals. One important preferred embodiment is concerned with the splitting of organic 1,2-bis-sulfides to form vinyl sulfides at temperatures in the range of about 150 to 450° C. (preferably 300 to 400° C.) in the presence of particles of an adsorptive agent (e.g., activated carbon) which is substantially devoid of catalytic effects pertaining to the rearrangement of hydrocarbon molecules, as exemplified by the pyrolysis of 1,2-bis(phenylthio)-propane to form predominantly 2-phenylthio-propylene (phenylisopropenyl sulfide).

Other aspects of the invention relate to elimination of undesired by-products by a further reaction of the products of pyrolysis with a substance of the group consisting of acetylenic and vicinal diolefin compounds (e.g., allene or methylacetylene) to produce the same or a different olefinic sulfide or by treatment with an aqueous alkaline substance.

The bis-sulfide starting materials of the present invention may be produced where necessary by the addition of two mols of an alkyl or aryl mercaptan (e.g., benzenethiol) to a monoacetylenic or vicinal dienic compound, such as methylacetylene or allene, in an addition which probably involves free radical chain reactions. The reaction may be initiated by introducing a trace of oxygen or other free radical initiator in the reactants.

The instant pyrolysis reaction proceeds at temperatures of the order of about 150 to 450° C. over a suitable contact material according to the general equation:

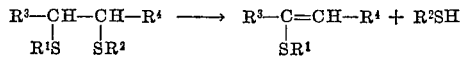

wherein the various R symbols represent hydrogen or a variety of refractory, saturated organic groups, as indicated before. $R^1$, $R^2$, $R^3$ and $R^4$ may each designate a different substituent or any two or more may stand for the same one; for example, $R^1$ and $R^2$ are likely to be identical groups derived from a hydrocarbon while either $R^3$ or $R^4$ represents hydrogen in certain important embodiments of the invention. Among the many suitable organic radicals which may be named for the purposes of illustration are methyl, ethyl, n-propyl and higher homologues, phenyl, tolyl, methoxyphenyl, phenoxyphenyl, nitrilophenyl, aminophenyl and methylcarboxyphenyl

groups. In general, hydrogen or unsubstituted hydrocarbon radicals are preferred for many variations of the instant process.

A particularly important embodiment of the invention displaying certain unexpected individual characteristics is concerned with the production of a major proportion of organic sulfides containing a terminal ethylenic or vinyl group from 1,2-bis-sulfides, and it proceeds chiefly according to the following equation, wherein the R symbols have the meaning set forth hereinbefore.

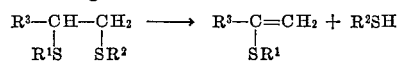

This reaction may be carried out at temperatures in the range of about 150 to 450° C. (preferably about 300 to 400° C.) in the vapor phase at any pressure appropriate for maintaining that phase in the presence of an adsorptive agent which is substantially devoid of catalytic effects pertaining to the rearrangement of hydrocarbon molecules, as exemplified by activated carbon. It is also contemplated that similar results may be obtainable with other catalytically inert adsorbents, such as silica gel which has been treated to remove active acid sites to prevent or at least minimize tendencies toward acid-catalyzed cleavage. However, it appears that the contact material should be one capable of adsorbing organic materials on its surfaces inasmuch as similar results are not obtainable by inert particulate material, such as quartz flakes. The adsorptive material is desirably in particle form and provides a relatively high surface area per unit weight as illustrated by a surface area of about one or more square meters per gram. While this invention should not be regarded as restricted to any particular theory, it may be postulated that this particular vinylation reaction results from an unexpected free radical reaction which is probably induced by the increased concentration of reactant material on surfaces of the adsorbent.

To a minor extent, the preceding pyrolysis forms an internal olefinic sulfide in a side reaction that probably proceeds according to the equation:

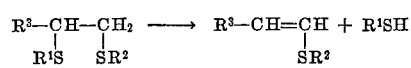

Where necessary or desirable, this unsaturated sulfide by-product may be separated from the vinyl sulfide product by appropriate conventional techniques, such as distillation and fractional crystallization. Whenever it may be wished to convert an aliphatic 1,2-bis-sulfide into a compound having an internal olefinic group, the 1,2-bis-sulfide reactant may be reacted in the presence of magnesium oxide or another adsorption agent having acid-catalytic characteristics, for such contact agents selectively direct the pyrolysis along that course in a reaction that is not thought to involve free radical effects to any significant extent. Also in the case of internal organic vicinal bis-sulfides (i.e., the sulfur atoms are not attached to the end two carbon atoms of an aliphatic radical), there is no objection to an adsorbent acid catalytic characteristics and in such cases the resulting olefinic sulfide will have an internal double bond.

There appears to be some tendency towards reversal of the cleavage reaction after the reaction products have left the contact material and while they are still hot, for mercaptans are likely to form addition products with olefinic compounds. Accordingly, it is recommended that the reaction mixture be rapidly quenched as by quick chilling to a low temperature of about 0° C. or lower in one or more receivers cooled with ice or a Dry Ice-acetone mixture, or by treatment with an alkaline material as exemplified by an aqueous solution of sodium hydroxide or potassium carbonate, or better still by conversion of the RSH compound into an unsaturated olefin by reaction with a vicinal diolefinic or acetylenic compound. The latter scavenging reactant may have the formula:

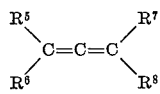

in the case of a vicinal diolefinic substance or $$R^9-C\equiv C-R^{10}$$

in the case of an acetylenic material.

The symbols are $R^5$ to $R^{10}$, inclusive, have the same connotation as $R^1$ to $R^4$ and $R^5$ to $R^{10}$ may be the same or different substituents. Unsubstituted hydrocarbon radicals or hydrogen are usually preferred. This scavenging reaction improves the yield of unsaturated sulfide and may be illustrated by the following equation in the case of an acetylene:

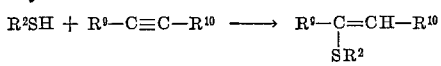

In general, it is preferable to employ a scavenging reactant which will produce the desired olefinic sulfide product. Thus, with 1,2-bis-sulfide propane starting material, it is desirable to use allene (propadiene) or methylacetylene as the secondary reactant. However, a wide variety of other scavenging materials may be used, as for instance, 1,2-butadiene, 1,2-cyclododecadiene, phenylacetylene 1- or 2-butyne and cyclododecyne.

Vinyl sulfides are particularly useful as polymerizable monomers and comonomers; moreover, they may function as agents for cross-linking linear unsaturated polyesters, or bonding to cellulosic fibers. The resulting polymeric materials may be utilized for various purposes, such as textile finishing agents for imparting one or more of such qualities as resilience, resistance to soiling, crease resistance and water repellency to suitable textile fabrics.

For a better understanding of the nature and objects of this invention, reference should be had to the accompanying examples. All proportions are stated in terms of weight and all temperatures as degrees centigrade throughout this specification and accompanying claims unless otherwise indicated.

EXAMPLE 1

A solution of 1,2-bis(phenylthio)-propane in an equal volume of benzene is introduced through a syringe needle from a constant drive syringe pump at a rate sufficient to provide a residence time of 0.1 to 10 seconds in contact with a bed of 10 grams of 6–14 mesh per inch granular activated carbon (AC grade) in a ¾ inch internal diameter, 12″ long tubular Vycor reactor fitted with an inside thermowell and heated to a constant temperature by adjusting the current to an external electrical resistance element. A stream of nitrogen gas is also charged to the reactor as a diluent, and the benzene serves as a solvent. The reaction temperature in the carbon bed is maintained at an average temperature of 360° C. and the volumetric liquid hourly space velocity (LHSV) of bis-sulfide reactant passing through the bed is 1.0. The reaction products are collected in an ice-cooled trap and washed with 5% aqueous sodium hydroxide solution to eliminate the benzenethiol by-product; then the immiscible organic product layer is separated and subjected to vapor phase chromatographic analysis. A conversion of 90% is obtained and the product comprises 2-phenylthio-propylene and 1-phenylthio-propylene in a 63.7:36.3 weight ratio.

EXAMPLE 2

The procedure of Example 1 is repeated in all respects except that the reaction temperature is lowered to 300° C. The percentage conversion drops to 80% here, but the distribution of products, namely 2-phenylthio-propylene and 1-phenylthio-propylene in a ratio of 74:26 in the pyrolyzate is more desirable for most purposes.

EXAMPLE 3

The apparatus of Example 1 is employed in a modification of the process in which the nitrogen diluent and the alkaline wash are omitted. Gaseous allene at a rate of 60 cc. per minute corresponding to 1.2 mols per mol of bis-sulfide feed is charged to the reactor along with the benzene solution of 1,2-bis(phenylthio)-propane. The average temperature of the carbon bed is held at 300° C. and the space velocity is reduced to 0.5 LHSV. The allene serves as a diluent in the reaction and a scavenger in converting about 75% of the benzenethiol formed into the desired 2-phenylthio-propylene. High conversion occurs and the ratio of 2-phenylthio-propylene to 1-phenylthio-propylene in the product mixture is 77:23.

EXAMPLE 4

The procedure of Example 1 is repeated in all respects except for the substitution of a bed of magnesium oxide in 0.1 inch particle size in place of the carbon, omission of the nitrogen stream and the use of a space velocity of 0.5 LHSV. A conversion of 95% is obtained at 360° C. and the olefinic sulfide product contains 89.2% of 1-phenylthio-propylene, 6.6% of 2-phenylthio-propylene and 4.0% of 3-phenylthio-propylene-1.

EXAMPLE 5

The procedure of Example 4 is repeated at an average reaction temperature of 300° C. in obtaining a conversion of 80% with a product consisting of 89% 1-phenylthio-propylene, 7% of 2-phenylthio-propylene and 5% of 3-phenylthio-propylene-1. In essence the direction of cleavage over magnesium oxide is highly selective and typical of acid-catalyzed cleavage with preferential splitting of the central carbon-sulfur bond leading to a beta-elimination of benzenethiol.

While the present process has been illustrated in a number of specific detailed examples, it will be apparent to those skilled in the art that many other modifications and embodiments fall within the purview of the present invention. Accordingly, the present invention should not be regarded as limited in any particulars except as may be set forth in the appended claims or required by the prior art.

I claim:
1. A process for producing an olefinic sulfide which comprises the vapor phase pyrolytic cleavage of an organic vicinal bis-sulfide in the presence of an adsorptive agent substantially devoid of catalytic activity for the conversion of hydrocarbons, said cleavage proceeding according to the general equation:

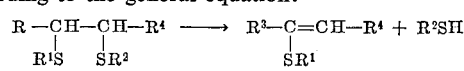

wherein $R^1$, $R^2$, $R^3$, and $R^4$ each represents a substituent of the group consisting of hydrogen and monovalent hydrocarbyl radicals substantially stable at a temperature up to about 450° C. and devoid of nonbenzenoid unsaturation.

2. The process according to claim 1 in which said $R^2SH$ compound is reacted with a substance of the group consisting of acetylenic and vicinal diolefin compounds to produce an olefinic sulfide.

3. A process according to claim 1 in which $R^1$ and $R^2$ designate the same substituent and an acetylenic compound is introduced to produce a further reaction according to the equation:

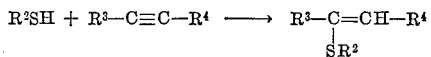

whereby the yield of the unsaturated organic sulfide product is substantially increased.

4. A process according to claim 1 in which said pyrolysis is conducted at a temperature between about 150 and 450° C.

5. A process according to claim 1 in which said pyrolysis is conducted at a temperature between about 300 and 400° C. in the presence of activated carbon particles.

6. A process according to claim 1 in which $R^4$ represents a hydrogen atom.

7. A process according to claim 6 in which said pyrolysis is conducted at a temperature between about 150 and 450° C.

8. A process according to claim 6 in which said pyrolysis is conducted at a temperature between about 300 and 400° C. in the presence of particles of activated carbon.

9. A process according to claim 6 in which the products of said pyrolytic reaction are reacted with a substance of the group consisting of acetylenic and vicinal diolefin compounds to produce an organic sulfide having a terminal ethylenic group.

10. A process which comprises the vapor phase pyrolytic cleavage of 1,2-bis(phenylthio)-propane at temperatures in the range of about 300 to 400° C. in the presence of particles of activated carbon to form predominantly 2-phenylthio-propylene and benzenethiol.

11. A process according to claim 10 in which allene is introduced to convert a substantial proportion of benzenethiol formed in said pyrolytic reaction into 2-phenylthio-propylene.

12. A process according to claim 10 in which methylacetylene is introduced to convert a substantial proportion of benzenethiol formed in said pyrolytic reaction into 2-phenylthio-propylene.

13. A process according to claim 10 in which benzenethiol is removed from the products of said pyrolysis by treatment with an aqueous alkaline agent.

14. A process which comprises the vapor phase pyrolytic cleavage of 1,2-bis(phenylthio)-propane at temperatures in the range of about 150 to 450° C. in the presence of particles of magnesium oxide to form predominantly 1-phenylthio-propylene and benzenethiol.

References Cited

UNITED STATES PATENTS

| 2,392,294 | 1/1946 | Rust et al. | 260—609 XR |
| 3,315,000 | 4/1967 | Ransley | 260—609 |
| 3,069,472 | 12/1962 | Loev et al. | 260—609 |
| 3,071,622 | 1/1963 | Laufer et al. | 260—609 |

OTHER REFERENCES

Van der Ploeg et al.: "Rec. Trav. Chemie," vol. 81, pp. 775–785 (1962).

Reid: "Chem. of Bivalent Sulfur," vol. 2, pp. 32, 33 (1960).

CHARLES B. PARKER, *Primary Examiner.*

D. R. PHILLIPS, *Assistant Examiner.*

UNITED STATES PATENT OFFICE
CERTIFICATE OF CORRECTION

Patent No. 3,428,688

February 18, 1969

El-Ahmadi I. Heiba

It is certified that error appears in the above identified patent and that said Letters Patent are hereby corrected as shown below:

Column 3, line 10, "adsorbent acid" should read -- adsorbent having acid --. Column 4, lines 73 to 75, the left-hand portion of the equation should appear as shown below:

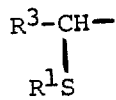

Column 5, line 6, "The" should read -- A --.

Signed and sealed this 7th day of April 1970.

(SEAL)
Attest:

Edward M. Fletcher, Jr.
Attesting Officer

WILLIAM E. SCHUYLER, JR.
Commissioner of Patents